Aug. 17, 1965

F. E. BROOKS ETAL 3,201,730

HIGH VOLTAGE TRANSFORMER AND RECTIFIER TUBE
WITH DIRECT CONNECTION THEREBETWEEN

Filed May 4, 1962

INVENTORS
FORREST E. BROOKS &
CHARLES C. IDEN
BY
W. H. Sponagle
Attorney 3,201,730
Patented Aug. 17, 1965

3,201,730

HIGH VOLTAGE TRANSFORMER AND RECTIFIER TUBE WITH DIRECT CONNECTION THEREBETWEEN

Forrest E. Brooks, Moorestown, N.J., and Charles C. Iden, Cambridge, Ohio, assignors to Radio Corporation of America, a corporation of Delaware Filed May 4, 1962, Ser. No. 192,528
6 Claims. (Cl. 336—107)

This invention relates to high voltage systems, and particularly to improved arrangements for high voltage generating systems of the type employed, for example, in television receivers.

In a known system for developing the high voltage for application to the final accelerator electrode of the receiver picture or cathode ray tube, an auto-transformer is provided, a tap on the coil of the auto-transformer being connected to the anode of a horizontal deflection output tube. The horizontal deflection voltage is taken from a pair of taps on the said coil, and the voltage developed across the whole coil after rectification is applied to the final accelerating electrode of the receiver picture or cathode ray tube. In a prior art high voltage system, the high voltage coil and the rectifier are separately mounted on the receiver chassis and a lead extends between the high voltage end of the coil and the anode cap of the rectifier tube. Due to the high voltage present in this lead, there is danger of arcing of this voltage to other parts of the television receiver chassis and of corona production at any part of the lead that may be kinked or bent at a small radius. To prevent arcing-over, the high voltage coil and the high voltage rectifier are usually mounted in a relatively large shielded enclosure. However, preventation of corona from the lead between the coil and the rectifier is still a problem, and the lead positioning must be carefully determined and maintained to prevent corona discharge from the lead.

It is an object of this invention to provide an improved high voltage system suitable for television receivers.

It is an object of the invention to provide a high voltage system in which arcing-over or corona discharge from the connection of the high voltage terminal of the high voltage coil to the rectifier is reduced.

This invention comprises a high voltage auto-transformer in which the high voltage terminal includes a cup-like or funnel-shaped conductor mounted on the high voltage auto-transformer, and in which the rectifier is so mounted on the shielding housing containing the transformer that, when the shield is closed, the anode cap of the rectifier extends into and makes contact with the high voltage terminal of the transformer, thereby eliminating the lead between the high voltage terminal on the auto-transformer and the anode cap of the rectifier and reducing concomitant arcing and corona problems.

This invention is more fully explained in the following detailed description thereof taken with the accompanying drawing in which.

Figures 1, 2, 3, 4, 5:
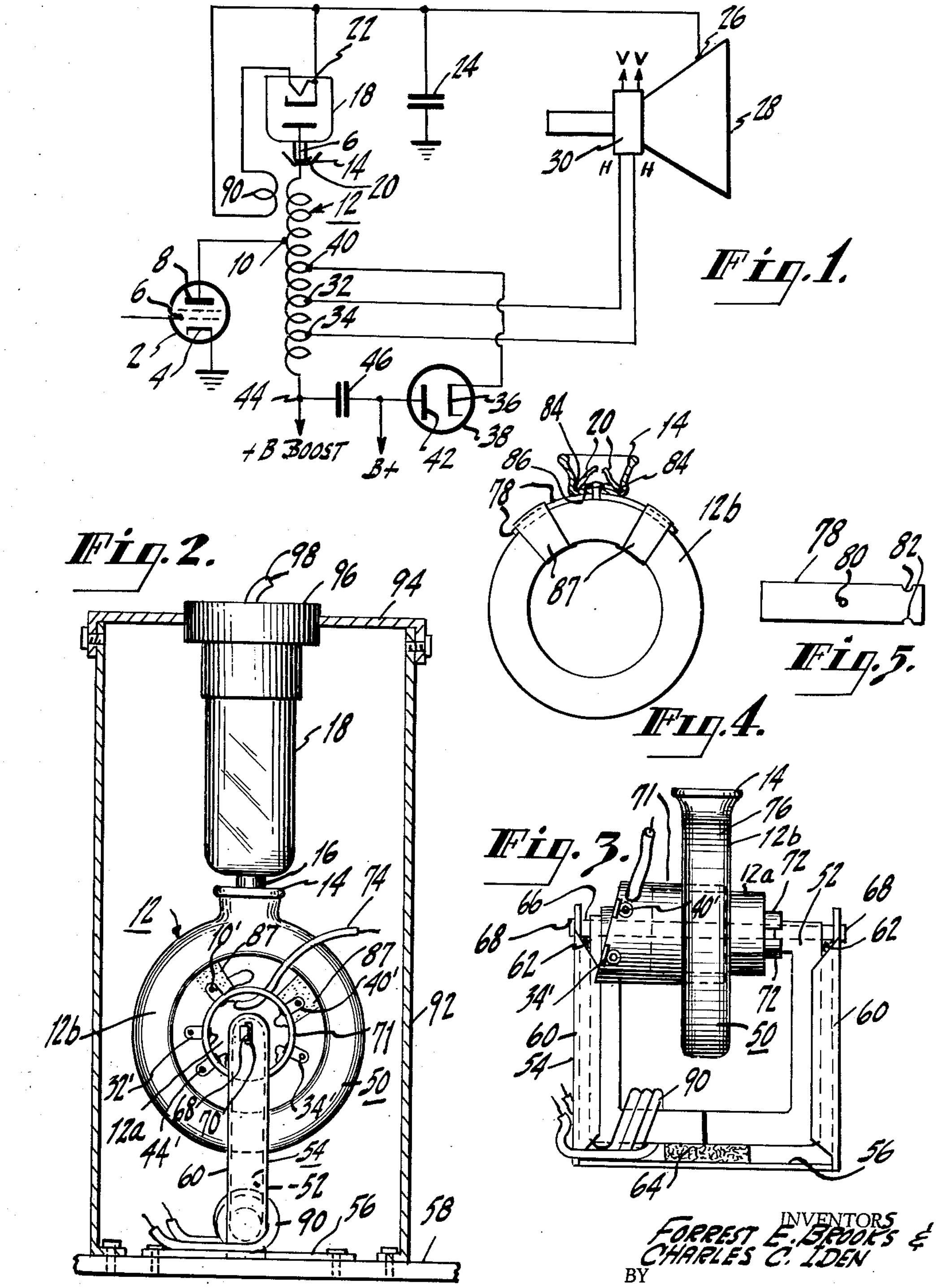
FIG. 1 is a partial circuit diagram of a high voltage system for a television receiver embodying the invention and showing diagrammatically the relative arrangement of the high voltage coil and of the rectifier tube.
FIG. 2 is a front elevation of a high voltage auto-transformer and rectifier tube mounted within a shielding housing, the housing being in section to show the arrangement of the auto-transformer and rectifier tube therein.
FIG. 3 is a side elevation of an auto-transformer.
FIG. 4 is a diagrammatical showing of the attachment of the high voltage terminal to the auto-transformer coil, with the high voltage terminal shown in section; and, FIG. 5 is a plan view of a terminal mounting strip useful with this invention.

Turning first to FIG. 1, a horizontal deflection output tube 2 has its cathode 4 connected to ground, and a suitable saw-tooth voltage is applied to the grid 6 of the output tube 2. The anode 8 of output tube 2 is connected to a tap 10 on a high voltage auto-transformer coil 12. The high voltage end of coil 12 is connected to high voltage terminal 14 and the anode cap 16 of high voltage rectifier 18 either contacts terminal 14 directly, or cap 16 makes electrical contact with spring wires 20, which are themselves connected to terminal 14, as will be explained. One base pin 22 of rectifier tube 18, which is connected to the cathode thereof, is connected to high voltage filter capacitor 24, the other terminal of capacitor 24 being connected to ground, the junction of pin 22 and capacitor 24 being connected to the high voltage terminal 26 of cathode ray tube 28. Heater current for rectifier tube 18 is supplied by transformer secondary 90. The horizontal deflection yoke 30 is connected between the two taps 32 and 34 on coil 12, the taps 32 and 34 being between tap 10 and the low voltage end of coil 12. The cathode 36 of damping tube 38 is connected to a tap 40 on coil 12 between taps 10 and the pair of taps 32 and 34, and the anode 42 of damping tube 38 is connected to the low potential end 44 of coil 12 through +B-boost capacitor 46. B+ voltage is applied to the junction of anode 42 and capacitor 46, and +B-boost voltage may be taken from the end 44 of coil 12.

The circuit as thus far described is known, and its operation understood. FIGS. 2–5 are referred to in the following explanation of the structure of the high voltage transformer and cooperative mounting of the high voltage transformer and high voltage rectifier.

The transformer 50 itself, which is shown in FIGS. 2 and 3, comprises a hollow rectangular core 52 of magnetic material such as ferrite. The core portion 52 is mounted in a supporting frame 54, the bottom plate portion 56 of which is flat, and through holes in which bottom portion 56 screws may be placed to fix the frame 54 to the chassis 58. The frame also includes inwardly turned upstanding channel-shaped arm portions 60 for partially embracing a pair of opposite legs of core 52. Padding 62, such as sponge rubber, is inserted between the end wall of channel portions 60 and the adjacent legs of core 52, and a piece of padding 64 is placed between a third leg of core 52 and the bottom plate 56 of frame 54. A bracket 66 extends between the top portions of channel-shaped arms 60 and through slots 70 therein. The ends 68 of bracket 66 are bent at right angles to the remainder thereof to secure the bracket 66 in place with respect to frame 54. The bracket 66 extends within and along a slot (not shown) in the fourth leg, here shown as the top leg of core 52. In this manner, core 52 is held in place in frame 54 and is cushioned therein by pads 62 and 64.

The coil 12 is mounted on the fourth leg of core 52 and comprises two coil portion 12*a* and 12*b* separated by a cylindrical insulating contact support 71. The relatively low voltage coil portion 12*a* is wound on semi-cylindrical insulating forms 72 which are positioned on the fourth leg. Coil portion 12*a* comprises a cylindrical winding of more than half the length of a core leg. Connections to the low voltage terminal of coil 12*a* and to the several, here shown as three, of the required taps on coil 12*a* are connected to terminal connectors 44′, 34′, 32′ and 40′ (corresponding respectively to connections 44, 34, 32 and 40 of FIG. 1), each mounted on contact support 71.

The remaining relatively high voltage portion 12*b* of coil 12 is mounted on contact support 71. This remaining coil portion 12*b* is wound in the form of a narrower cylindrical disk and is centrally located with respect to winding portion 12*a*. The tap that is to be connected to the anode 8 of output tube 2 is taken from this latter portion 12*b*. This tap is connected to connector 10′ (corresponding to tap 10 of FIG. 1) mounted on contact support 71 and a lead 74 connected to connector 10′ is provided for connection to the anode 8 of output tube 2. The high voltage output connector 14 is mounted on the outside periphery of coil 12*b* and is connected to the high voltage end thereof.

The structure and mounting of connector 14 on coil 12*b* will be explained by reference to FIGS. 4 and 5. In FIG. 4, the high voltage portion 12*b* of coil 12 is shown before the tire-shaped corona ring 76 of insulating material is applied to the periphery of this coil portion 12*b*. FIG. 4 illustrates the mounting of terminal cup 14 on coil portion 12*b*.

In FIG. 5 is shown a mounting strip 78 used in mounting connector 14 on coil portion 12*b*. This strip 78 is of elongated form and of conducting material. A hole 80 is provided therethrough and notches 82 are provided adjacent one end of strip 78, for purposes to be disclosed.

The terminal cup 14 (FIG. 4) is of funnel-like shape. The bottom of this cup 14 is closed, except for a rivet-receiving hole, and a peripheral channel 84 is formed in the bottom of cup 14 to receive a partial ring 86 of spring material having ends 20 bent out of the plane of the ring. The ring 86 is so mounted in channel 84 that the bent ends 20 thereof extend away from coil portion 12*b*. The cup is riveted to mounting strip 86 by means of a rivet extending through the hole in the cup 14 and through the hole 80 (FIG. 5) in the strip 78. The high voltage end of the winding is wound around strip 78 and into the notches 82 where it is suitably secured in good electrical contact with strip 78. The strip 78 is laid on the insulated outer layer of winding portion 12*b* and bent to conform therewith and pieces 87 of adhesive tape are applied to the strip 78 and coil portion 12*b* to hold the strip in place. While the tape 87 is not removed, the tape 87 is of the nature of a temporary connection since the insulation comprising the corona ring 76 is applied around the circumference of the coil portion 12*b* and molded about the outside of cap 14, leaving the edges and the inside of cap 14 uninsulated. The further method of assembly of transformer 50, not being any part of this invention is not explained herein.

The high voltage rectifier heater winding 90 is wound about the third, bottom leg of core 52 and comprises only a few turns, here shown as three, of insulated conductor.

Referring again to FIG. 2, a shield member 92, which may have four closed sides and two open ends, is mounted on chassis 58 of the television receiver as by means of screws. The transformer 50 is mounted on chassis 58 in shield member 92 and a socket 96 for the high voltage rectifier 18 is mounted upon a detachable shielding top 94 for shield member 92. A portion of the chassis 58 and the top 94, together with shield member 92 complete the shielding enclosure for the transformer 50 and rectifier tube 18. When the shield top 94 is in place, as shown in FIG. 2, the top member 94 may be fixed to shield member 92 as by screws, and in this position cap 16 of rectifier tube 18, which is mounted in socket 96, is received within terminal cup 14 of high voltage transformer 50.

As noted above, tube socket 96 is placed in a hole in shield top or plate 94. The face of the socket 96 having the pin-receiving holes therein is so directed that when shield top 94 is in place, the pin-receiving holes are directed towards terminal cup 14. High voltage lead 98 extends from socket 96 for connection to terminal 26 of cathode ray tube 28.

For proper operation of the device of this invention, cap 16 should make good electrical contact with terminal cup 14. It will be noted that, when top 94 is moved to its closed position on shield member 92, tube 18 and cap 16 extend downward into shield portion 92, making it difficult to direct cap 16 into cup 14. Furthermore, a small difference in dimensions or positioning of socket 96, of transformer 50 or its components or of rectifier tube 18 may prevent cap 16 from reaching into cup 14 far enough to make electrical contact with cup 14. To insure good electrical connection between cap 16 and cup 14, cup 14 is funnel-shaped and is large enough in diameter at its open end to receive a portion of cap 16 even though the rectifier tube 18 may not be fully centered in socket 96. Contact of cap 16 with funnel-shaped cup 14 corrects the positioning of the tube 18 in socket 96 and guides cap 16 into contact with cup 14. The spring ends 20 are provided to make good contact with cap 16 though a centrally located cap 16 may not extend far enough into cup 14 to make direct contact therewith.

While the cup 14 has been shown as directed upwardly, cup 14 may extend in any direction in a plane through coil 12 and perpendicular to the axis thereof that is convenient for mounting the electron or rectifier tube 18. For example, if the rectifier 18 is horizontally positioned, it may be desired to mount the cup 14 on coil 12 in a plane through the axis of the coil 12 and parallel to the base 56.

What is claimed is:

1. A combination of a transformer and a shield comprising,
   - a transformer core of magnetic material,
   - mounting means for said core,
   - a coil winding mounted on said core,
   - a conductive cup mounted on said coil and connected to an end of said coil,
   - means for mounting a first shield portion in shielding relation to at least a portion of said transformer,
   - said first shield portion having an opening therein,
   - a further shield portion,
   - an electron tube socket mounted on said further shield portion,
   - said socket having pin-receiving openings in a face thereof,
   - means for mounting said further shield portion on said first shield portion so as to close said opening in said first shield portion and with said pin-receiving openings of said socket facing toward said transformer winding,
   - said transformer being mounted in said shield in such manner that at least a portion of said cup extends towards said socket, and
   - a rectifier tube having pins in the base thereof, and a cap connector at an end thereof remote from said base,
   - said rectifier tube being mounted with its base pins inserted in the pin-receiving openings of said socket, and with its cap connector inserted in said conductive cup.

2. The combination of a transformer, a rectifier and a shield comprising,
   - a two part shield,
   - one shield part having an opening therein and the second shield part serving to close said opening,
   - a socket having pin-receiving openings in a face thereof so mounted on said second shield part that said face of said socket is exposed to the interior of said shield,
   - a transformer having a terminal,
   - said transformer being mounted within said shield in such manner that said terminal extends towards said face,
   - a rectifier tube having base pins and a cap connection, said base pins being inserted into said pin-receiving openings and said cap connection being in electrical contact with said terminal.

3. In a television receiver including a transformer serving to energize windings of a deflection yoke, said transformer including a high voltage winding supplying high voltage impulses to a rectifier tube to effect development of a D.C. operating voltage for a cathode ray tube, the combination comprising:

a shield member having an access opening;

means for mounting said transformer within said shield member, the high voltage winding of said transformer being of generally disc-like configuration and supporting on its periphery an output terminal in the form of a conductive cup-like member, the open mouth of said cup-like member facing toward a region of said shield opening;

additional shielding means serving to close said opening when oriented in operational position;

and means for mounting said rectifier tube on said additional shielding means, said rectifier tube having a cap connector which is inserted within said cup-like terminal of said winding when said additional shielding means is oriented in its operational position.

4. In a television receiver including a horizontal deflection output transformer incorporating a high voltage winding for developing high voltage impulses at an output terminal thereof, and a high voltage rectifier having cathode and anode electrodes for developing at its cathode electrodes a high D.C. operating voltage for the receiver's cathode ray tube in response to the application of said high voltage impulses to its anode electrode, the combination comprising:

a shield for said horizontal deflection output transformer comprising a first shield member having an access opening;

means for mounting said output transformer within said first shield member, the high voltage winding of said transformer being of generally disc-like configuration and supporting on its periphery a cup-shaped member of conductive material in electrical contact with an extremity of said high voltage winding, said cup-shaped member serving as said high voltage winding output terminal and being oriented on said winding periphery with its open end facing toward said opening of said first shield member;

a closure for said opening in said first shield member, said closure comprising a second shield member supporting a tube socket having pin-receiving openings facing toward the interior of said first shield member;

and means for utilizing as said high voltage rectifier a rectifier tube having base pins and a cap connector and including a cathode electrode connected to a base pin and an anode electrode connected to said cap connector, said rectifier tube being mounted with its base pins inserted in pin-receiving openings of said socket and its cap connector inserted in said cup-shaped member whereby application of said high voltage impulses from the output terminal of said high voltage winding to the high voltage rectifier anode electrode is effected via direct electrical contact between the anode cap connector of said rectifier tube and said high voltage winding output terminal.

5. A deflection output transformer comprising a core of magnetic material incorporating four legs disposed to form an apertured rectangle;

a coil form encircling a leg of said core;

a low voltage winding surrounding said coil form;

a cylindrical member encircling at least a portion of said low voltage winding and providing support for a plurality of terminals;

a plurality of wire connections between said low voltage winding and said terminals;

a disc-like high voltage winding encircling said cylindrical member and electrically connected at an inner winding extremity to said low voltage winding;

a flexible strip of conducting material secured in a position overlying a portion of the outer periphery of said high voltage winding and in electrical contact with an outer extremity of said high voltage winding;

a cup-shaped member of conductive material secured to said strip in electrical contact therewith, said cup-like member having interior walls of a generally funnel-shaped contour tapering from a relatively wide lip facing away from said core to a relatively narrow base adjacent said strip, the interior dimensions of said cup in the region of said base being such as to admit reception of a rectifier tube anode cap therein;

and a generally tire-shaped corona ring of insulating material enclosing the outer surfaces of said high voltage winding and the exterior walls of said cup-shaped member below said lip.

6. A deflection output transformer comprising a core of magnetic material incorporating four legs disposed to form an apertured rectangle;

a coil form encircling a leg of said core;

a low voltage winding surrounding said coil form;

a cylindrical member encircling at least a portion of said low voltage winding and providing support for a plurality of terminals;

a plurality of wire connections between said low voltage winding and said terminals;

a disc-like high voltage winding encircling said cylindrical member and electrically connected at an inner winding extremity to said low voltage winding;

a flexible strip of conducting material secured in a position overlying a portion of the outer periphery of said high voltage winding and in electrical contact with an outer extremity of said high voltage winding;

a cup-shaped member of conductive material secured to said strip in electrical contact therewith, said cup-like member having interior walls of a generally funnel-shaped contour tapering from a relatively wide lip facing away from said core to a relatively narrow base adjacent said strip, the interior dimensions of said cup in the region of said base being such as to admit reception of a rectifier tube anode cap therein;

a spring member of conductive material mounted within said cup-like member and in electrical contact therewith, said spring member having a free end extending away from the base of said cup-shaped member, and being subject to deflection toward said base;

and a generally tire-shaped corona ring of insulating material enclosing the outer surfaces of said high voltage winding and the exterior walls of said cup-shaped member below said lip.

References Cited by the Examiner

UNITED STATES PATENTS

| | | | |
|---|---|---|---|
| 1,599,842 | 9/26 | Schneider | 336—107 |
| 2,428,948 | 10/47 | Torsch et al. | 336—107 |
| 2,502,591 | 4/50 | Ray | 317—99 |

FOREIGN PATENTS

| | | |
|---|---|---|
| 601,443 | 7/60 | Canada. |
| 1,021,348 | 2/53 | France. |

JOHN F. BURNS, *Primary Examiner.*

LARAMIE E. ASKIN, *Examiner.*